Dec. 12, 1967  K. G. HATCH  3,357,421
THERMOSTATIC CONTROL FOR HOT WATER TANKS AND THE LIKE
Filed Oct. 12, 1965
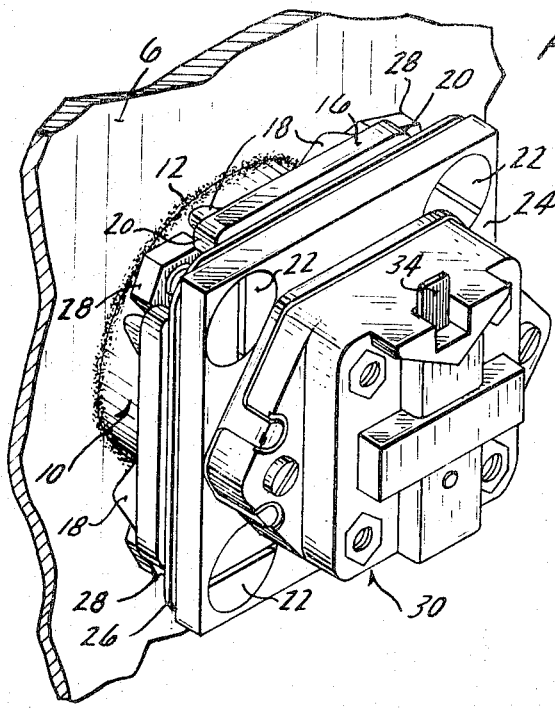
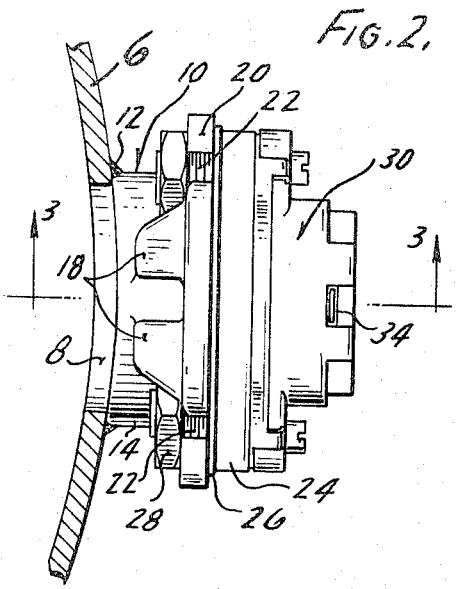
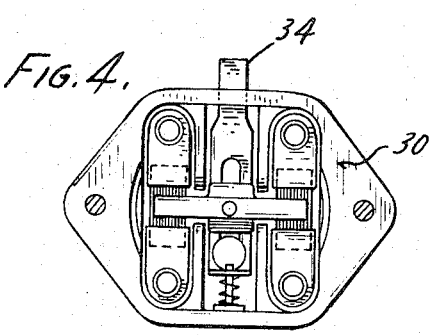
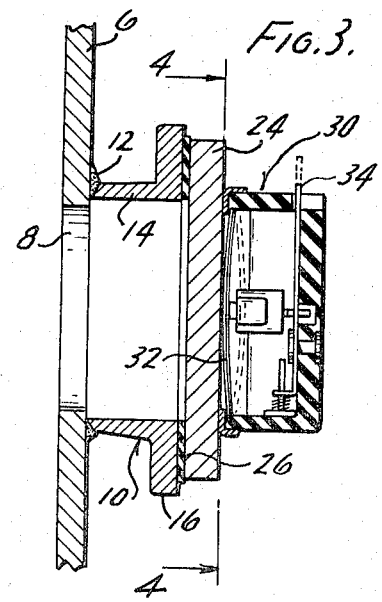
INVENTOR
KENNETH G. HATCH
BY
Wheeler, Wheeler & Wheeler
ATTORNEYS.

United States Patent Office 3,357,421
Patented Dec. 12, 1967

3,357,421
THERMOSTATIC CONTROL FOR HOT WATER TANKS AND THE LIKE
Kenneth G. Hatch, Milwaukee, Wis., assignor to Hatco Corporation, Milwaukee, Wis., a corporation of Wisconsin
Filed Oct. 12, 1965, Ser. No. 495,087
5 Claims. (Cl. 126—374)

ABSTRACT OF THE DISCLOSURE

A sensing device mounting for a tank having an apertured wall comprises a short sleeve welded to the wall about the aperture and having an exposed outer end provided with a packing ring of thermally insulating material. The sensing device is mounted on a highly thermally conductive plate anchored against the packing ring and having a surface to which the sensing device is attached, whereby the sensing device is easily accessible and responds selectively to the temperature of the contents of the tank without being unduly influenced by heat conduction from the tank wall.

---

This invention relates to a sensing device such as a thermostatic control for hot water tanks and the like.

In the past, thermostats have commonly been applied directly to the side wall of a tank to be subject to heat passing through the tank wall. A specific example concerns the use of temperature-limiting thermostats, which find their greatest need in situations in which the heating unit has very great capacity in relation to the amount of water being heated. Because the wall of conventional tank has low thermal conductivity, the rate of heat transmission through the wall of a conventional hot water tank may be sufficiently slow so that damage may be done before the thermostat reacts. If the tank is lined, as with enamel or the like, the problem is accentuated. Moreover, because the wall of the conventional tank is cylindrical, a relatively expensive installation is required to achieve reasonably sensitive control.

The instant invention provides a means whereby a very sensitive sensing device of moderate cost can be applied with ease to any desired tank installation in a manner which makes response independent of heat conduction through the wall of the tank to give sensitive and substantially immediate response to conditions which would create excessive temperatures if not checked at once.

According to the instant invention, a hole is cut completely through the tank wall. Around this hole an adapter ring is welded to the tank, the ring being designed to permit clamping connection to its free end spaced from the tank of a closure plate of high thermal conductivity, preferably upon an intervening gasket. In addition to the usual function of the gasket, it has value as an insulator against loss of heat from the tank to the closure plate. Moreover, because of its insulating value, the gasket tends to assure that the thermostat mounted on this plate will be more sensitively responsive to the temperature of the water rather than the temperature of the tank.

Because of the high conductivity of the plate, and the fact that it is flat, and the overload control can be applied in face contact therewith, great sensitivity and immediate response result. The desired effect is achieved more satisfactorily and at less cost than conventional systems which are less satisfactory.

It will be understood that reference herein to a temperature-limiting thermostat is to be construed as an exemplification of the invention, without limitation to such a thermostat.

In the drawings:
FIG. 1 is a view in perspective showing a sensing device applied to a water tank wall in accordance with the present invention.
FIG. 2 is a view of the sensing device and adapter in plan, the tank being shown in cross section.
FIG. 3 is a detail view taken in section on the line 3—3 of FIG. 2.
FIG. 4 is a detail view taken in section on the line 4—4 of FIG. 3.

The tank wall 6 is conventional. As best shown in FIG. 2, it is cylindrical in form. In order to resist the water pressure which it normally is obliged to contain, it is made of relatively heavy metal which, being usually a rust-resistant stainless alloy (or being lined) has relatively low thermal conductivity. In accordance with the present invention, an aperture 8 through the tank wall is provided. The adapter 10 is welded to the tank wall at 12 to enclose the hole 8 as indicated in FIGS. 1 to 3. The adapter comprises a short sleeve 14 provided at its free and otherwise open outer end with anchorage means for a highly heat conductive plate. The anchorage means may comprise a mounting flange 16 which constitutes a gasket or packing seat and may have integral re-enforcing gussets 18 connecting it with the sleeve 14. Notched slots are provided at 20 for clamping bolts 22 which pass through a heat transfer closure plate 24 made of aluminum or other highly conductive metal. Because the area of the plate is relatively small, it does not have to be as heavy as would be necessary if a plate of this light material had greater area. Packing such as gasket 26 is preferably supported on the seat provided by flange 16 where it is interposed between the plate 24 and the flange 16 to assure a watertight connection and also tends to isolate the plate thermally from the metal of the tank. The water of the tank enters freely into the sleeve portion 14 of the adapter, which portion will normally be very short and requires only to be sufficiently long to permit manipulation of the nuts 28 with which the bolts 22 of the anchorage means are provided.

The illustrative temperature sensitive device 30 includes contacts which may directly engage the flat plate 24 in the manner shown in FIGS. 3 and 4. The action of the particular device disclosed is such that an overload causes the bimetallic members 32 to spring over center. They can be reset by means of the hand lever 34. No other details are shown because the article is conventional and is merely illustrative of a sensing device which is commercially available and designed to fit against a flat surface and hence has not heretofore been usable effectively as applied to the generally cylindrical surface of a tank such as that shown at 6. It will be understood that the disclosure is solely illustrative and that any comparable thermally responsive sensing device can be applied in like manner to the flat face provided by the highly conductive plate 24. It is one of the advantages of the invention that it is not limited to a particular type of sensing device whereas, in the past, some devices of this character have been impracticable and even the most desirable types of thermally sensitive devices have not responded as rapidly as desired because of the intervention of the boiler wall.

I claim:
1. The combination with a sensing device for a tank having a wall, of a mounting for the sensing device comprising a plate which is highly thermally conductive and has a surface to which the sensing device is directly attached, a fitting having a hole through it and having an end applicable about an aperture in a tank wall, said fitting having a free outer end with anchorage means to which said plate is applied and said plate constituting a closure spaced from the tank across the hole of said fitting and being thereby exposed to the contents of the tank.

2. The combination with a temperature sensing device for a tank having a wall provided with an aperture, of an annular fitting having a permanent connection with said wall about the aperture and provided with a mounting flange, a plate of highly thermally conductive material spanning the fitting and having means connecting it with said flange to close the opening through the fitting and the tank wall, a packing which is relatively thermally non-conductive and which intervenes between the flange and the plate, and means for securing the sensing device directly upon said plate in a position in which it is materially insulated by the packing from heat in said wall while being exposed to heat conducted through the plate from the tank contents to which the plate is exposed through the apertured wall and said fitting.

3. A means for supporting a temperature sensing device on an apertured tank wall, said means comprising a metal annulus applicable to the tank wall about the aperture and having a free end portion provided with anchorage means, the end of said annulus having a packing seat, a gasket engaged with said seat and having thermal insulation value which is high as compared with the annulus, and a plate of high thermal conductivity spanning the fitting and in clamping engagement with the gasket and having means connecting it with the anchorage means of the fitting.

4. The combination with a tank having a generally cylindrical wall provided with an aperture, of an annular fitting welded to the tank about the aperture, said fitting having an open end provided with a gasket seat and with an outwardly projecting mounting flange, a gasket applied to the gasket seat of the open end, a plate of high thermal conductivity applied to the gasket across the open end of the fitting, bolts connecting the plate with the flange of the fitting and subjecting the gasket to compression, and a temperature sensitive device mounted on said plate and exposed to heat conducted through the plate from the contents of the tank to which the plate is exposed through the fitting and the aperture of the wall.

5. A method of mounting a sensing device on a generally cylindrical tank wall, which method consists in cutting a hole through the tank wall, welding a collar to the tank wall about the hole, fastening across the collar a closure of material more heat conductive than the tank wall, thermally insulating the closure from the collar, and attaching the sensing device to the closure to be subjected to heat communicated to it through the closure from the contents of the tank.

References Cited

UNITED STATES PATENTS

| | | | |
|---|---|---|---|
| 2,520,872 | 8/1950 | Zuehlke | 73—343 X |
| 3,040,579 | 6/1962 | Taylor | 73—343 |
| 3,149,782 | 9/1964 | Grayson et al. | 236—33 |

JAMES W. WESTHAVER, *Primary Examiner.*

ROBERT A. DUA, *Examiner.*